C. A. NELSON.
FAUCET.
APPLICATION FILED MAY 27, 1919.
1,383,231.
Patented June 28, 1921.
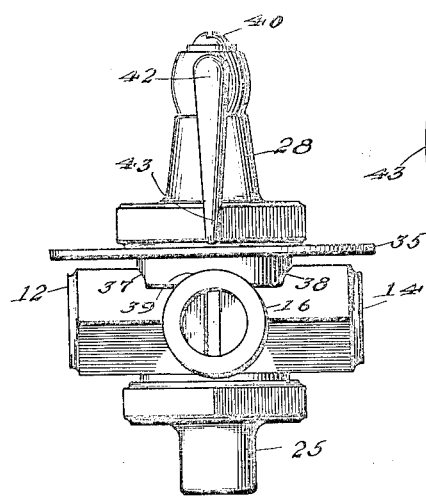
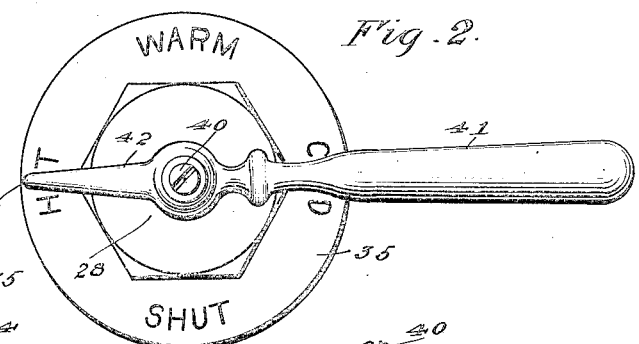
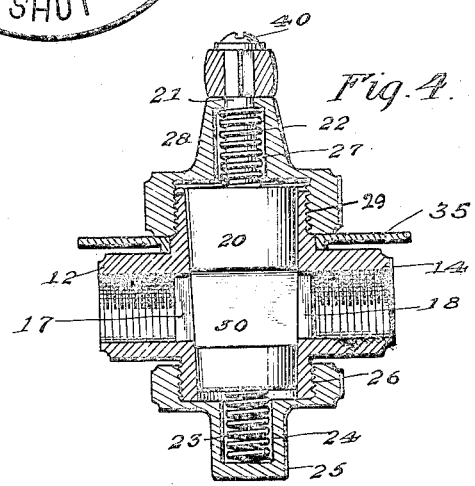
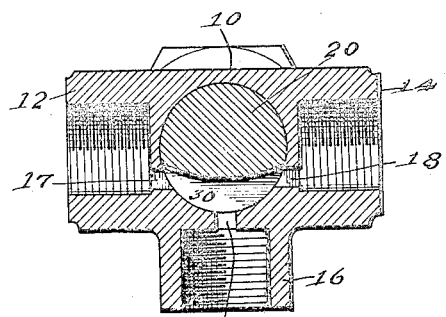
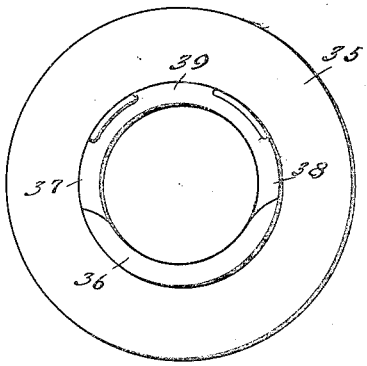
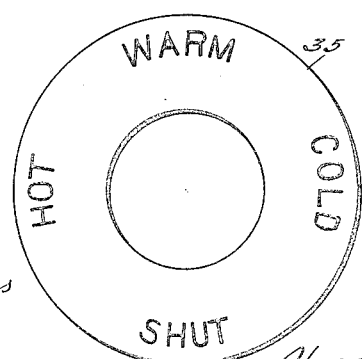
WITNESS:
R. C. Thomas
INVENTOR.
C. A. Nelson.
BY
Victor J. Evans
ATTORNEY.

UNITED STATES PATENT OFFICE.

CARL A. NELSON, OF MOLINE, ILLINOIS.

FAUCET.

1,383,231.     Specification of Letters Patent.     Patented June 28, 1921.

Application filed May 27, 1919. Serial No. 300,033.

*To all whom it may concern:*

Be it known that I, CARL A. NELSON, citizen of the United States, residing at Moline, in the county of Rock Island and State of Illinois, have invented new and useful Improvements in Faucets, of which the following is a specification.

This invention relates to a faucet, and the object is to provide a combination faucet for connection with a plurality of inlet pipes through which hot and cold water respectively are admitted to the casing of the faucet, to be discharged from the nozzle thereof, either separately or together, in the desired proportion, in order to obtain water of the desired temperature.

A further object is to provide in a faucet of the type indicated, a casing having a plurality of ports oppositely located, and an intermediate port, and a valve member having a transverse channel, the various elements being so proportioned that either hot or cold water, or a given quantity of each may be allowed to flow to and through the discharge port; with particular means whereby the valve member may be exactly positioned for effecting the desired result.

With the foregoing and other objects in view, the invention consists in the novel construction, combination and arrangement of elements hereinafter described and claimed.

In the drawings,

Figure 1 is a view of the faucet in front elevation, Fig. 2 is a top plan view, Fig. 3 is a horizontal section through the ports of the casing, Fig. 4 is a vertical section, and Figs. 5 and 6 are top and bottom plan views, respectively, of the plate referred to below, and showing how this element is positioned with reference to the inlet and outlet connections.

In the drawings I have shown the casing for the faucet and it will be understood that the inlet and discharge connections may be of usual construction. The casing as a whole is designated 10, the inlet connection is shown at 12, or rather one of the inlet connections, the other being designated 14. The intermediate connection, to which the nozzle is to be secured is shown at 16. The ports for these connections are indicated respectively by the reference numbers 17, 18 and 19.

The bore of the casing is tapered, and the valve member or plug 20 is correspondingly tapered, a stem 21 being provided at the larger end, and this stem being surrounded by a spring 22. A spring 23 bears against the lower end of the plug, or against a washer which may directly abut said lower end.

The spring 23 is received within a bore 24 in the cap 25, the latter having connection with the casing by means of screw threads, as shown at 26.

The stem 21 passes through the bore 27 of the cap 28 having threaded connection with the casing as shown at 29, and bore 27 also receives spring 22.

The valve member is provided with a transverse channel or port 30, and this port is of the extent required to permit of placing the two inlet ports in communication with the discharge port at the same time, it being obvious that by rotating the valve member slightly from the position just indicated, either of the inlet ports may be partly cut off, so that the proportion of cold water to the flow of hot water may be varied, or vice versa.

The devices for controlling the valve member and indicating the correct position thereof are important. A plate member 35, which may be circular in form, carries the designations indicated in the drawing, and the flanged portion 36 on the under side thereof is cut away at 37, 38 and 39, in order to fit the pipe connections 12, 14 and 16, the plate being retained in position by the upper threaded cap 28.

Connected with the stem 21 by means of a screw 40 is a handle 41 carrying an indicating device 42, which is downwardly deflected at 43, so that the end thereof moves directly over the plate. The relation between the handle, indicating device, valve member, the plate and its cut away portions, and the various ports is such that when the elements are assembled (the handle having been applied to the squared end 44 of the stem), the indicating device 42 will coöperate with the designations on plate 35 for indicating the position to which the valve should be moved to obtain the required result. Hot water, warm water, or cold water may be obtained in this manner, or the valve may be shut off.

The valve member is self-seating and therefore requires no packing, nor rubber or composition washers or plungers.

In actual service and where subjected to hard usage, they are found to give far better results than the combination faucets heretofore on the market. And further, it is obvious that a faucet of this type may be employed for drawing different liquors or gases from a plurality of containers, in a given proportion, the plate member 35 carrying suitable designations for that purpose.

What I claim is—

1. In a device of the class described, a casing provided with a plurality of inlet ports and an outlet port, a valve member having a port therein proportioned to communicate with all of the ports at one time and to vary the relative proportion of fluid admitted through the inlet ports, an indicating device having a fixed relation to the valve member and the port thereof, and means coöperating with the indicating device and including yoke elements constructed to fit the casing in a predetermined position with reference to the ports thereof, whereby the relative position of the valve port and the remaining ports is controlled.

2. In a device of the class described, a casing provided with a plurality of inlet ports and an outlet element and port, a valve member having a portion proportioned to communicate with all of the casing ports at one time, a handle for the valve member, an indicating device carried by the handle, a plate carrying designations and coöperating with the indicating device for showing the position of the valve with reference to the ports, and means comprising a yoke element carried by the plate and proportioned to fit the outlet element of the casing and determine the position of said plate with reference to the ports of the casing, the indicating device and the port of the valve having a predetermined relation.

In testimony whereof I affix my signature.

CARL A. NELSON.